(12) United States Patent
Langen

(10) Patent No.: US 11,176,927 B2
(45) Date of Patent: Nov. 16, 2021

(54) COMPUTER-IMPLEMENTED METHOD FOR PROVIDING AN ADAPTIVE DIALOGUE SYSTEM, AND ADAPTIVE DIALOGUE SYSTEM

(71) Applicant: Siemens Aktiengesellschaft, Munich (DE)

(72) Inventor: Manfred Langen, Munich (DE)

(73) Assignee: SIEMENS AKTIENGESELLSCHAFT

(*) Notice: Subject to any disclaimer, the term of this patent is extended or adjusted under 35 U.S.C. 154(b) by 211 days.

(21) Appl. No.: 16/406,497

(22) Filed: May 8, 2019

(65) Prior Publication Data
US 2019/0348031 A1 Nov. 14, 2019

(30) Foreign Application Priority Data
May 14, 2018 (EP) .................................... 18172009

(51) Int. Cl.
| | |
|---|---|
| *G10L 15/18* | (2013.01) |
| *G06F 16/332* | (2019.01) |
| *G10L 15/22* | (2006.01) |
| *G06F 40/30* | (2020.01) |
| *G10L 15/30* | (2013.01) |
| *H04L 12/58* | (2006.01) |

(52) U.S. Cl.
CPC ...... *G10L 15/1815* (2013.01); *G06F 16/3329* (2019.01); *G06F 40/30* (2020.01); *G10L 15/22* (2013.01); *G10L 15/30* (2013.01); *G10L 2015/223* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 2011/0238410 A1* | 9/2011 | Larcheveque | G06F 16/355 704/9 |
| 2016/0196490 A1 | 7/2016 | Chandrasekaran et al. | |

* cited by examiner

*Primary Examiner* — Paras D Shah
*Assistant Examiner* — Athar N Pasha
(74) *Attorney, Agent, or Firm* — Schmeiser, Olsen & Watts LLP

(57) ABSTRACT

A computer-implemented method for providing an adaptive dialogue system is provided. Here, there is an automatic capture of at least one dialogue segment from a dialogue participant communicating with the dialogue system. There is an automatic comparison of the captured dialogue segment with dialogue segments of a stored dialogue segment model. After the comparison, there is an automatic assignment of at least one corresponding dialogue segment to the captured dialogue segment according to the dialogue segment model if the captured dialogue segment is contained in the dialogue segment model or there is an automatic addition of the captured dialogue segment to a dialogue segment group if the captured dialogue segment is not contained in the dialogue segment model. A dialogue segment is generated depending on the dialogue segments of the dialogue segment group and the generated dialogue segment is stored in the dialogue segment model.

8 Claims, 3 Drawing Sheets

Figure 1:
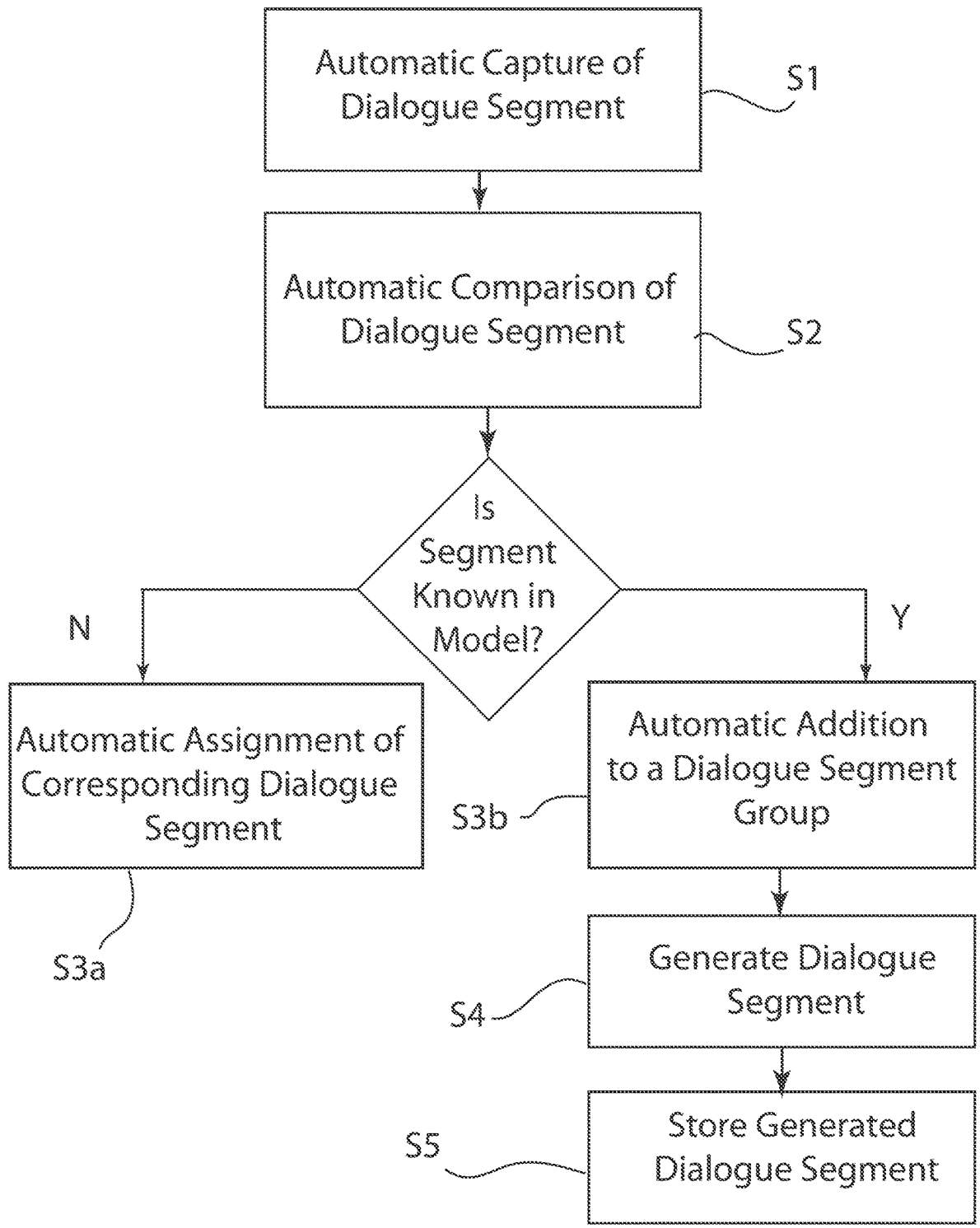

COMPUTER-IMPLEMENTED METHOD FOR PROVIDING AN ADAPTIVE DIALOGUE SYSTEM, AND ADAPTIVE DIALOGUE SYSTEM

CROSS-REFERENCE TO RELATED APPLICATIONS

This application claims priority to European Application No. 18172009.5, having a filing date of May 14, 2018, the entire contents of which are hereby incorporated by reference.

FIELD OF TECHNOLOGY

The following relates to a computer-implemented method for providing an adaptive dialogue system. Furthermore, the following relates to an adaptive dialogue system.

BACKGROUND

Technical dialogue systems, so-called chatbots, find use in many software applications and electronic devices. These find use wherever the user (human user) of the software application or the electronic device wishes to receive an automatic response to queries, so-called dialogue segments, without directly intervening in the response process in this case. Chatbots are known in the known art, for example "Siri" by Apple Inc., which is an installed software application on handhelds and computers and which outputs and/or carries out a response reaction in accordance to a user query. Robots represent a further example of a technical dialogue system, for example the humanoid robot "Pepper", based on a human, which is programmed to analyze humans and their facial expressions and gestures, and react accordingly to these emotional states.

Chatbots and also humanoid robots should continuously increase their repertoire of response reactions, and hence their available dialogue space, by interaction with the human user. Currently available options for a chatbot/robot to learn or self-learn by interaction or conversation with a human user are still very restricted.

In order to process corresponding user queries, or in order to react/respond thereto, chatbots/robots use knowledge databases, which are programmed according to the envisaged field of use of the chatbot/robot. As a consequence, user queries which cannot be converted into an adequate and expected response reaction will repeatedly surface in a conversation between the chatbot/robot and the human user. The majority of questions frequently posed in a conversation depend greatly on the use scenario and the respective human user and can only be predicted and accordingly programmed to a limited extent by the manufacturer of the chatbot/robot. The non-comprehensive programming of the chatbots/robots that results in gaps of responses is complemented by various methods.

One option used by chatbots/robots known from the known art lies in resorting to "fallback reactions". By way of fallback reactions, such as "I'm sorry, I didn't understand you", "could you please rephrase your question" or "let us talk about something else", to name but a few, the software algorithm, if no appropriate response reaction to the user query is present or programmed, attempts to guide the human user in such a way that the human poses a query that may be similar enough for a response to be stored in the database or that the topic of the conversation is moved in a very different direction.

A further option lies in using the dialogue segments that were not understood for a search in a search engine, e.g., Google, in order to return the best search engine, hit in response. In most cases, this leads to the complete return of the website, which may contain the answer.

Therefore, there is a need for a computer-implemented method for providing an adaptive dialogue system. In particular, there is a need for an adaptive dialogue system that closes gaps in responses as quickly and as conveniently as possible.

SUMMARY

Accordingly, provision is made for:

A computer-implemented method for providing an adaptive dialogue system, with a step for automatically capturing at least one dialogue segment from a dialogue participant communicating with the dialogue system. The method further comprises an automatic comparison of the captured dialogue segment with dialogue segments of a stored dialogue segment model. Furthermore, the method comprises an automatic assignment of at least one corresponding dialogue segment to the captured dialogue segment according to the dialogue segment model if the captured dialogue segment is contained in the dialogue segment model or an automatic addition of the captured dialogue segment to a dialogue segment group if the captured dialogue segment is not contained in the dialogue segment model. Further, the method comprises the step of generating a dialogue segment depending on the dialogue segments of the dialogue segment group. Furthermore, the method comprises storing the generated dialogue segment in the dialogue segment model.

Here, a dialogue segment should be understood to mean, in particular, a combination of spoken or written words, and also whole sentences.

Here, a dialogue segment model should be understood to mean, in particular, the scope of the known dialogue segments, for which the adaptive dialogue system can provide an appropriate answer.

Here, a dialogue segment group should be understood to mean, in particular, a list of the dialogue segments captured but not known by the adaptive dialogue system, which can be stored and consequently can be provided for further processing.

Furthermore, provision is made for:

An adaptive dialogue system comprising a capturing unit, which is embodied to capture at least one dialogue segment of a dialogue participant, a memory unit, which is embodied to store at least one captured dialogue segment of a dialogue participant, a processor unit, which is embodied to automatically compare at least one captured dialogue segment to dialogue segments of a stored dialogue segment model and assign a dialogue segment to the at least one captured dialogue segment according to the dialogue segment model if the captured dialogue segment is contained in the dialogue segment model or automatically add at least one captured dialogue segment to a dialogue segment group if the captured dialogue segment is not contained in the dialogue segment model, and an output unit, which is embodied to provide the dialogue segment group to a dialogue agent.

Finally, provision is made for:

A chatbot or robot having an adaptive dialogue system according to embodiments of the invention.

The embodiments are based on the discovery that there is increased acceptance of the chatbots/robots by a human user precisely as a result of a quick and convenient expansion of the dialogue segment model and hence as a result of the option of providing an appropriate answer to all dialogue segments (queries) of the human users. Consequently, increased sales of chatbots/robots can be achieved.

Furthermore, the capability of the chatbots/robots is increased in such a way that this yields an increased spectrum of use in very different applications with very different objectives therefor.

Additionally, embodiments of the present invention yield the option of saving hardware resources that are required for a complicated search for appropriate responses to received dialogue segments. This results in both the memory and the necessary computational processor capacity being able to be designed to be less powerful since there is no need to search with great outlay for responses to received dialogue segments on the Internet by way of query searches and subsequently evaluate these in order to provide the dialogue participant with the correct answer.

By way of the adaptive dialogue system there is continuous monitoring of non-conformance. This results from the fact that, advantageously, all dialogue segments that are not understood are stored in embodiments of the present invention and subsequently provided in structured fashion for further processing or preparing such that appropriate dialogue segments (responses) are assigned to these initially unknown dialogue segments (queries), and the chatbot/robot can react to these queries as expected by the human user in future. The so-called non-conformance is consequently removed by corrective measures. Advantageously, embodiments of the present invention consequently provide an option for directly introducing countermeasures for non-conformance.

Moreover, the adaptive dialogue system provides for a structured expansion and improvement of the dialogue segment model, as a result of which the outlay for the development of the dialogue segment model can be significantly reduced at the start of the development process in particular. Additionally, the development outlay for "fallback reactions" is very low since the necessity of "fallback reactions" is no longer given, precisely as a result of the advantageous learning ability of the adaptive dialogue system.

A further advantage arising from the possibility of the learning ability is that the dialogue segment model can be extended with very simple means and very little outlay. By way of example, complicated restructuring and programming of the database and/or the software of the chatbot/robot is not necessary. The unknown dialogue segments specified by a human user or the dialogue segments not stored in the dialogue segment model are collected and structured, sorted according to categories and provided in prioritized fashion, as a result of which there can be efficient work through and assignment of appropriate answers to the dialogue segments by the human user. This reduces the time outlay for teaching the chatbot/robot or the programming outlay. The new dialogue segment pairs (query of the human user and corresponding answer) are incorporated in the dialogue segment model present.

According to one embodiment, the captured dialogue segment comprises an audio-based and/or text-based dialogue segment. Advantageously, audio-based dialogue segments from human users can be captured and processed by embodiments of the present invention. Furthermore, it is advantageous that audio-based dialogue segments can also be captured by the adaptive dialogue system in digital or analog format in the present case and can be processed by means of the computer-implemented method. Advantageously, text-based dialogue segments, created by a human user and the adaptive dialogue system by way of an interface, for example a keyboard, can also be captured and processed. Additionally, the adaptive dialogue system can also capture and process text-based dialogue segments from entertainment, such as from chats from short message messengers, for example, such as WhatsApp, Twitter and Facebook.

According to one embodiment, the captured audio-based and/or text-based dialogue segment is stored in at least one memory unit of the dialogue system. Advantageously, the audio-based and/or text-based dialogue segments captured by the chatbot/robot are stored in a memory unit of the adaptive dialogue system. By way of example, this memory unit can be an exchangeable memory unit, such as, e.g., a hard disk drive, an SD card, or an integrated memory unit, such as random access memory (RAM), for example.

According to one embodiment, the captured audio-based dialogue segment is automatically converted into a text-based dialogue segment by means of voice recognition. Advantageously, the audio-based dialogue segment captured by the adaptive dialogue system is analyzed by voice recognition and automatically converted into a text-based dialogue segment and stored in the memory unit. Advantageously, both the audio-based and the text-based dialogue segment are stored and made available for the creation of a corresponding dialogue segment as a response to the captured dialogue segment.

According to one embodiment, the dialogue segments of the dialogue segment group are categorized. Advantageously, the unknown dialogue segments from a human user or a chat, which are captured by the chatbot/robot, are initially collected and made available. The unknown dialogue segments, also so-called "white utterances", are automatically combined in categories/clusters by a "natural language classifier" (NLC). Here, unknown but similar dialogue segments are combined in a category such that various variants of similar but unknown dialogue segments are represented in one category. Advantageously, this reduces the outlay for increasing the learning ability since different and a correspondingly large number of dialogue segments with the same intent can be worked through in one category. Here, the intent represents the response reaction of the chatbot/robot to the dialogue segment provided by the human user or dialogue segment captured in a chat.

According to one embodiment, the categorized dialogue segments are weighted according to the frequency of their occurrence within the respective category. Advantageously, the categorized dialogue segments are weighted within their category according to the frequency of their occurrence. This results in sorting within the category, as a result of which the unknown dialogue segments with the highest priority are processed first. This is advantageous in that the unknown dialogue segments that are requested or queried most frequently by the human user and in chats are learnt first.

According to one embodiment, the categorized dialogue segments are provided to a dialogue agent via an audio-based and/or visual and/or text-based output unit of the dialogue system. The unknown dialogue segments that are automatically added to a category and prioritized are provided to a dialogue agent by way of an output unit, for example a graphical user interface (GUI), by way of a web interface, by way of a screen of a handheld or computer, or by way of an audio device, the dialogue agent in this respect providing appropriate associated dialogue segments to the unknown dialogue segments present in categories.

According to one embodiment, a dialogue segment is generated by the dialogue agent depending on the provided dialogue segment. By way of example, the dialogue agent can be a human expert in the field of the category and can generate appropriate dialogue segments (responses) to the unknown dialogue segments and provide these to the adaptive dialogue system. Advantageously, it is consequently possible to correctly, efficiently and quickly learn very specific, unknown dialogue segments.

In a further embodiment, the dialogue agent may be a knowledge graph, as a result of which prepared and compiled search results are provided according to the categories and consequently assigned to the unknown dialogue segments.

According to one embodiment, the dialogue segment generated by the dialogue agent is an audio-based and/or text-based dialogue segment. Advantageously, the adaptive dialogue system comprises an interface, as a result of which audio-based and/or text-based dialogue segments (responses) of the dialogue trainer can be captured according to the unknown dialogue segments.

According to one embodiment, the dialogue segment generated by the dialogue agent is stored in the dialogue segment model in a memory element of the dialogue system. Advantageously, the subsequently trained dialogue segment pairs (unknown dialogue segment in the dialogue segment model and corresponding dialogue segment provided by dialogue agents) are loaded into the memory, and hence into the application of the chatbot/robot, as a result of which the gaps, the "white utterances" in the dialogue segment model, are closed. Advantageously, there is an appropriate response reaction of the dialogue system by way of the output of a dialogue segment corresponding to the query in the case of a renewed query of the human user after learning.

According to one embodiment, the adaptive dialogue system comprises an interface, which is embodied to receive a dialogue segment generated by the dialogue agent depending on a dialogue segment of the dialogue segment group.

According to one embodiment, the processor unit of the adaptive dialogue system comprises a voice recognition component, which is embodied to carry out a voice recognition of an audio-based dialogue segment.

According to one embodiment, the processor unit of the adaptive dialogue system is embodied to categorize dialogue segments of the dialogue segment group and weight the categorized dialogue segments according to the frequency of their occurrence within the respective category.

BRIEF DESCRIPTION

Figure 2:
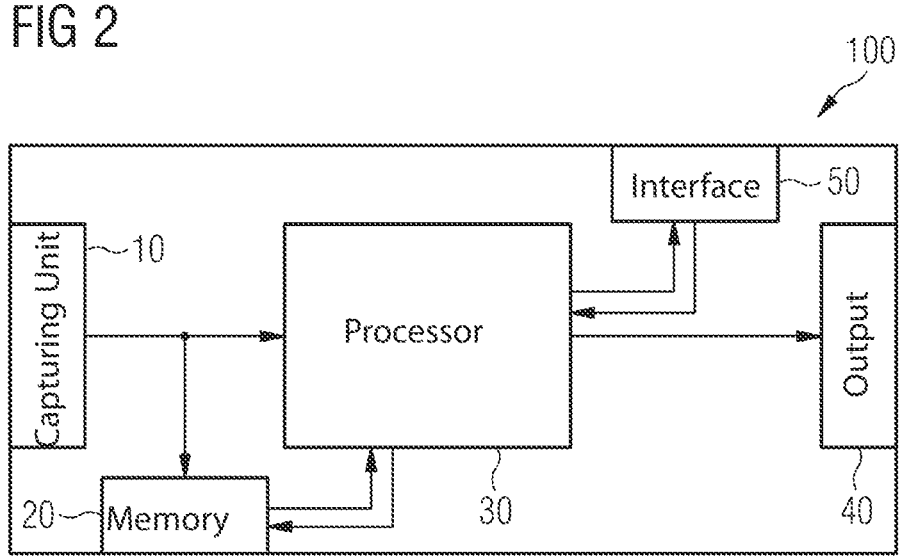
Figure 3:
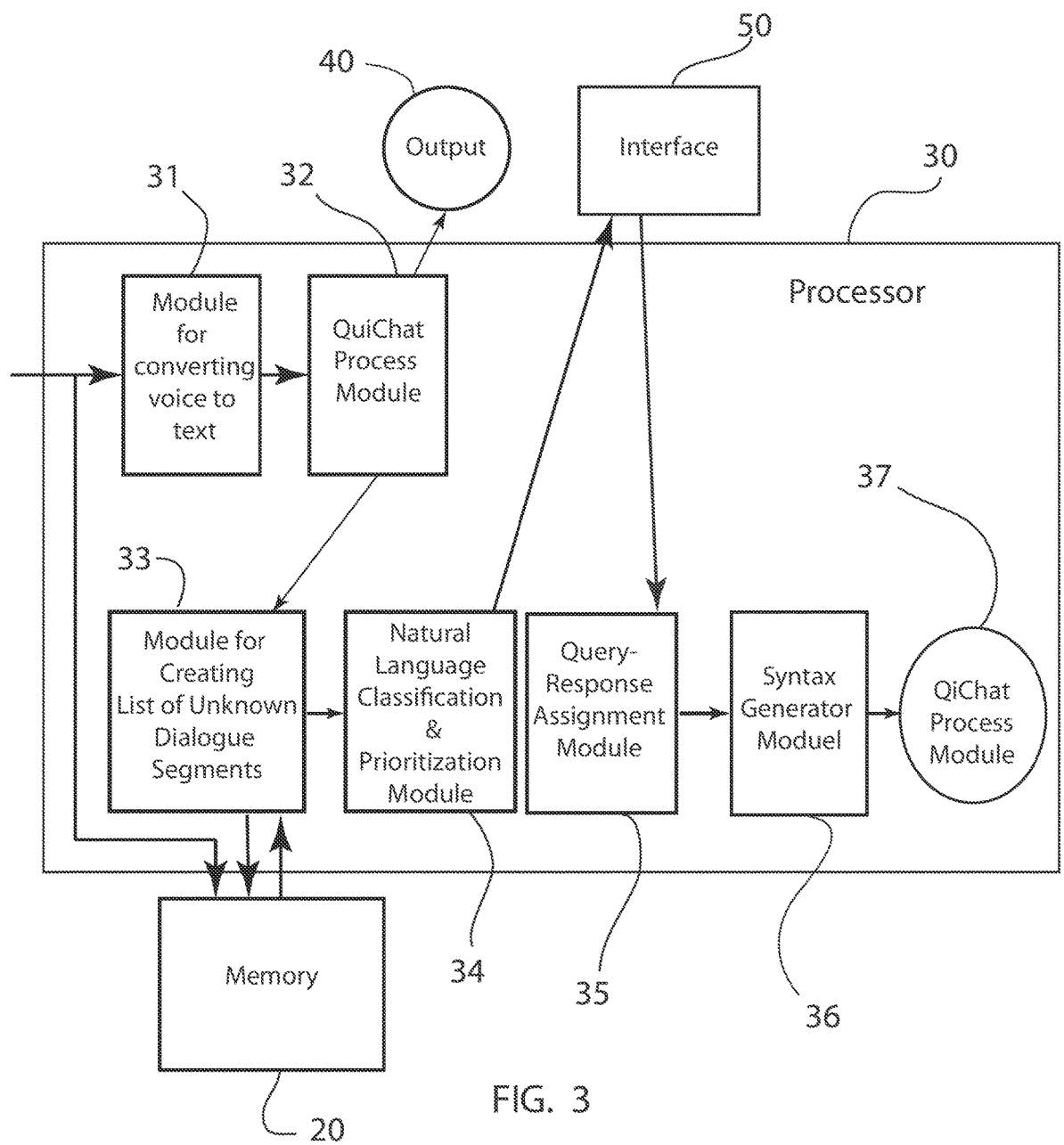

Some of the embodiments will be described in detail, with references to the following Figures, wherein like designations denote like members, wherein:

FIG. 1: shows a schematic illustration of a computer-implemented method for providing an adaptive dialogue system according to one embodiment;

FIG. 2: shows a schematic illustration of an adaptive dialogue system according to one embodiment; and FIG. 3: shows a schematic illustration of an adaptive dialogue system according to a further embodiment.

DETAILED DESCRIPTION

FIG. 1 shows a schematic illustration of a computer-implemented method for providing an adaptive dialogue system according to one embodiment.

The automatic capture of at least one dialogue segment from a dialogue participant communicating with the dialogue system is implemented in a first step S1. By way of example, the dialogue system can be a chatbot or humanoid robot. By way of example, the dialogue participant communicating with the dialogue system can be a human user of the dialogue system, which captures the dialogue segment, for example an audio-based dialogue segment or text-based dialogue segment, which is output by the human user. Furthermore, the dialogue system can capture text-based dialogue segments from chats of short message messengers, for example.

The automatic comparison of the dialogue segment captured by the dialogue system with dialogue segments of a stored dialogue segment model is implemented in a further step S2. The dialogue segment model comprises dialogue segments and correspondingly assigned dialogue segments (responses).

An automatic assignment of at least one corresponding dialogue segment to the captured dialogue segment according to the dialogue segment stored in the dialogue segment model is implemented in a further step S3a. This assignment is implemented if the dialogue segment captured by the dialogue system is contained in the dialogue segment model and hence known.

In a step S3b, as an alternative to step S3a, there is an automatic addition of the captured dialogue segment to a dialogue segment group if the captured dialogue segment is not contained in the dialogue segment model. The captured but unknown dialogue segments are collected and stored in the dialogue segment group.

In a further step S4, a dialogue segment (a response to a captured but unknown dialogue segment) is generated depending on the dialogue segments of the dialogue segment group.

The generated dialogue segment is stored in the dialogue segment model in a further step S5.

FIG. 2 shows a schematic illustration of an adaptive dialogue system 100 according to one embodiment.

The adaptive dialogue system 100 comprises a capturing unit 100, which is connected on the output side to the memory unit 20 and to the processor unit 30. The capturing unit 10 is designed to capture audio-based and text-based dialogue segments from a dialogue participant. The captured dialogue segments can be stored in the memory unit 20. By way of example, the memory unit 20 can be a hard disk drive, an SD card and/or a random access memory (RAM).

Furthermore, the memory unit 20 is connected to the processor unit 30. The processor unit 30 comprises a voice recognition component. The audio-based dialogue segments are converted into text-based dialogue segments by means of the voice recognition component and can be stored in the memory unit 20. Furthermore, the dialogue segment group with the captured but unknown dialogue segments can be stored in the memory unit 20.

Furthermore, the processor unit 30 of the adaptive dialogue system 100 is embodied to categorize the captured dialogue elements and weight the categorized dialogue segments according to the frequency of their occurrence within the respective category.

Furthermore, the adaptive dialogue system 100 comprises an output unit 40. The output unit 40 is connected to the processor unit 30. By way of example, the output unit 40 can be a graphical user interface (GUI), a web interface, a screen of a handheld or computer, or an audio device. The categorized and prioritized dialogue segments of the dialogue segment group are provided to a dialogue agent by the output unit 40.

Furthermore, the adaptive dialogue system 100 comprises an interface 50. The interface 50 is connected to the processor unit 30. By way of example, the interface 50 can be an audio-based and/or text-based and/or visual interface. The interface 50 is embodied to receive an audio-based and/or text-based dialogue element generated by a dialogue agent. By way of example, the interface 50 can be a graphical user interface (GUI), a web interface or a voice interface.

The output unit 40 and the interface 50 may be combined into an output and input unit in an alternative embodiment.

FIG. 3 shows a schematic illustration of an adaptive dialogue system according to a further embodiment.

FIG. 3 illustrates an exemplary implementation of the adaptive dialogue system 100 on the basis of the programming of the humanoid robot "Pepper" with the syntax of QiChat.

The embodiment of the adaptive dialogue system according to FIG. 3 represents no limitation in relation to the implementation in other programming languages and/or on other systems.

FIG. 3 illustrates the processor unit 30 of a dialogue system 100. The processor unit is connected to a receiver unit 10 (not illustrated), a memory unit 20 and an interface 50.

In this embodiment, the interface 50 both provides the dialogue segment group to the dialogue agent and receives the generated audio-based and/or text-based dialogue element.

The module denoted by reference sign 31 serves to convert an audio-based dialogue segment captured by the receiver unit into a text-based dialogue segment by way of voice recognition. The voice recognition can be designed for various languages. The audio-based dialogue segment is stored in the memory unit 20. The automatic comparison of the dialogue segment converted into a text-based dialogue segment with the dialogue segments saved in the dialogue segment model is implemented in the module 32 in a QiChat process. If the captured dialogue segment corresponds to a dialogue segment saved in the dialogue segment model, an appropriate answer is provided to the dialogue participant 40.

The dialogue segment model, too, can be designed for various languages.

A comparison of the captured dialogue segment with the dialogue segments contained in the dialogue segment model is carried out immediately, instead of a voice recognition, if a text-based dialogue segment is captured.

If the captured dialogue segment cannot be assigned to any dialogue segment of the dialogue group, the unknown dialogue segment is saved in a dialogue segment group in module 33 and can be stored in the memory unit 20.

The module denoted by reference sign 34 denotes a "natural language classifier", in which similar dialogue segments of the dialogue segment group are combined in a common category/cluster, which can accordingly have assigned a common answer. These dialogue elements that are combined in one category are weighted according to the frequency of their occurrence, as a result of which a processing sequence arises for the dialogue agent.

The dialogue elements that are combined in categories in the module 34 are provided to a dialogue agent via the interface 50, the dialogue agent providing an appropriate response. The latter is provided as a dialogue segment pair to a syntax generator 36 via the module 35. The dialogue segment pair comprises the different variants of the dialogue segments of a category and the appropriate response generated by the dialogue agent depending on the dialogue segments of a category. The syntax generator converts the different variants of the dialogue segments of a category into an appropriate QiChat statement. This can be loaded into the dialogue segment model with the corresponding generated response.

The embodiment relates to the dialogue system as per Pepper by Softbank Robotics. The programming follows the syntax of QiChat, which is defined as part of the AIDialog module in the NAOqi OS operating system.

Pepper is a humanoid robot based on a human, which is programmed to analyze humans and their facial expressions and gestures, and react accordingly to these emotional states. The aspect consists of allowing Pepper to make a good impression by virtue of also being able to answer general queries.

All queries made are stored in the memory unit 20 in the system as an audio file, for example in the uncompressed .wav file format or else in the compressed .mp3 file format. Furthermore, the result of the voice recognition is stored as a text file, for example in the .txt format, in the memory unit 20. Storing and keeping the audio file has the advantage that, if the voice recognition was not carried out correctly, the latter can be repeated, preventing a possibly unknown dialogue segment from being lost.

By recording dialogue segments (queries) for which the dialogue system has no response, the following exemplary variants were captured particularly frequently:

Who is soccer world champion?
Who is the soccer world champion?
Which country won the soccer World Cup?
Who won the soccer world championships?
Who won the soccer World Cup?
Who won the soccer world championships in 2014?

The same response can be provided for all captured variants: Germany won the World Cup in 2014.

So that the dialogue system can answer future queries in this respect, the dialogue agent can load the following exemplary statement into the dialogue segment model (QiChat module) as a result of the captured variants and the associated response:

u:(["[who"which country"]is{the}soccer world champion" "who won the soccer world cup]{2014}"]) Germany won the World Cup in 2014

In this respect, all dialogue segments that are not contained in the dialogue segment model and consequently do not allow the assignment of an answer should be intercepted first.

Intercepting the dialogue segments that are not contained can be implemented in a manner like the following exemplary statement:

Intercept everything else
U: (_*) you said $1 but I do not have a rule for this dialogue segment $output_heard=$1

By way of example, for the purposes of storing dialogue segments that are not contained, a python script is used to collect the dialogue segments $output_heard that were not understood in a file white_utter.text:

Import qi.path
wutterFilePath=
qi.path.userWriteableDataPath(self.packageUid( ), "white_utter.text")
wutterFile.write($output_heard)

The syntax generator converts the different captured variants of dialogue segments into a corresponding QiChat statement, as illustrated in exemplary fashion:

u:(["[who"which country"]is{the}soccer world champion" "who won the soccer world cup]{2014}"])

The associated exemplary answer: "Germany won the World Cup in 2014" is generated by the dialogue trainer and provided in audio-based or text-based fashion.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

LIST OF REFERENCE SIGNS

100 Adaptive dialogue system
10 Capturing unit
20 Memory unit
30 Processor unit
40 Output unit
50 Interface
31 Module for converting voice into text
32 QiChat process module
33 Module for creating the list of unknown dialogue segments
34 Natural language classification and prioritization module
35 Query-response assignment module
36 Syntax generator module
37 QiChat process module

The invention claimed is:

1. A computer-implemented method for adaptive dialogue processing, comprising:
   automatically capturing, by a processor of an adaptive dialogue system, at least one dialogue segment from a dialogue participant communicating with the dialogue system;
   automatically comparing, by the processor, the at least one captured dialogue segment with dialogue segments of a stored dialogue segment model;
   automatically assigning, by the processor, the at least one captured dialogue segment to a corresponding dialogue segment group according to the dialogue segment model if the at least one captured dialogue segment is contained in the dialogue segment model;
   automatically adding, by the processor, the at least one captured dialogue segment to an dialogue segment group of unknown dialogue segments if the captured dialogue segment is not contained in the dialogue segment model;
   automatically categorizing dialogue segments of the dialogue segment group of unknown dialogue segments;
   automatically weighting and sorting dialogue segments of the dialogue segment group of unknown dialogue segments according to frequency of occurrence with a respective category;
   generating, by the processor, a response dialogue segment depending on the automatic weighting and sorting;
   storing, the generated response dialogue segment in the dialogue segment model;
   providing the stored generated response dialogue segment to an automated dialogue agent; and
   outputting, by the automated dialogue agent, a response based on the stored generated response dialogue segment via at least one of an audio, visual, or text-based output unit of the dialogue system.

2. The computer-implemented method as claimed in claim 1, wherein the at least one captured dialogue segment comprises an audio-based and/or text-based dialogue segment.

3. The computer-implemented method as claimed in claim 2, wherein the captured audio-based and/or text-based dialogue segment is stored in at least one memory unit of the dialogue system.

4. The computer-implemented method as claimed in claim 2, wherein the captured audio-based dialogue segment is automatically converted into a text-based dialogue segment by voice recognition.

5. An adaptive dialogue system comprising:
   a capturing unit, configured to capture at least one dialogue segment of a dialogue participant,
   a memory unit, configured to store the at least one captured dialogue segment of the dialogue participant,
   a processor unit, configured to automatically compare the at least one captured dialogue segment to dialogue segments of a stored dialogue segment model and to at least one of: assign the at least one captured dialogue segment to a corresponding dialogue segment group according to the dialogue segment model if the at least one captured dialogue segment is contained in the dialogue segment model, and automatically add the at least one captured dialogue segment to a dialogue segment group of unknown dialogue segments if the at least one captured dialogue segment is not contained in the dialogue segment model, and wherein the processor unit is further configured to:
      automatically categorize dialogue segments of the dialogue segment group of unknown dialogue segments;
      automatically weight and sort dialogue segments of the dialogue segment group of unknown dialogue segments according to frequency of occurrence with a respective category; and
      generate a response dialogue segment depending on the automatic weighting and sorting; and
   an output unit, configured to provide the generated response dialogue segment group to a dialogue agent and output at least one of an audio, visual, and text-based response.

6. The adaptive dialogue system as claimed in claim 5, wherein the dialogue system comprises an interface, configured to receive the generated response dialogue segment.

7. The adaptive dialogue system as claimed in claim 5, wherein the processor unit comprises a voice recognition component, which is embodied to carry out a voice recognition of an audio-based dialogue segment.

8. A chatbot or robot having an adaptive dialogue system, the adaptive dialogue system comprising:
   a capturing unit, configured to capture at least one dialogue segment of a dialogue participant,
   a memory unit, configured to store the at least one captured dialogue segment of the dialogue participant,
   a processor unit, configured to automatically compare the at least one captured dialogue segment to dialogue segments of a stored dialogue segment model and to at least one of: assign the at least one captured dialogue segment to a corresponding dialogue segment group according to the dialogue segment model if the at least one captured dialogue segment is contained in the dialogue segment model, and automatically add the at least one captured dialogue segment to a dialogue segment group of unknown dialogue segments if the at least one captured dialogue segment is not contained in the dialogue segment model, and wherein the processor unit is further configured to:

automatically categorize dialogue segments of the dialogue segment group of unknown dialogue segments;

automatically weight and sort dialogue segments of the dialogue segment group of unknown dialogue segments according to frequency of occurrence with a respective category;

generate a response dialogue segment depending on the automatic weighting and sorting; and an output unit, configured to provide the generated response dialogue segment group to a dialogue agent and output at least one of an audio, visual, and text-based response.

* * * * *